US010271235B2

(12) United States Patent
Sapir et al.

(10) Patent No.: US 10,271,235 B2
(45) Date of Patent: Apr. 23, 2019

(54) SYSTEM, METHOD, AND COMPUTER PROGRAM PRODUCT FOR EFFICIENT PERFORMANCE INDICATOR MEASUREMENT VALUE GENERATION

(71) Applicants: Yoav Sapir, Rosh Ha'ayin (IL); Shachar Ebel, Rosh Ha'ayin (IL); TEOCO LTD., Rosh Ha'ayin (IL)

(72) Inventors: Yoav Sapir, Rehovot (IL); Shachar Ebel, Mevaseret Zion (IL)

(73) Assignee: TEOCO LTD., Rosh Ha'ayin (IL)

( * ) Notice: Subject to any disclaimer, the term of this patent is extended or adjusted under 35 U.S.C. 154(b) by 127 days.

(21) Appl. No.: 15/498,472

(22) Filed: Apr. 27, 2017

(65) Prior Publication Data

US 2018/0013641 A1 Jan. 11, 2018

Related U.S. Application Data

(60) Provisional application No. 62/358,574, filed on Jul. 6, 2016.

(51) Int. Cl.
G01R 31/08 (2006.01)
H04L 1/00 (2006.01)
H04W 24/10 (2009.01)
H04L 12/24 (2006.01)
H04L 12/26 (2006.01)
H04L 29/08 (2006.01)

(52) U.S. Cl.
CPC ......... *H04W 24/10* (2013.01); *H04L 41/5009* (2013.01); *H04L 43/04* (2013.01); *H04L 67/1097* (2013.01)

(58) Field of Classification Search
CPC .... H04W 24/10; H04L 41/5009; H04L 43/04; H04L 67/1079
See application file for complete search history.

(56) References Cited

U.S. PATENT DOCUMENTS

| 6,898,416 | B2* | 5/2005 | Saarinen | H04W 24/00 370/252 |
| 7,996,820 | B2* | 8/2011 | Auvenshine | G06F 9/5061 705/32 |

* cited by examiner

Primary Examiner — Maharishi V Khirodhar
(74) Attorney, Agent, or Firm — ATFirm PLLC; Ralph P. Albrecht

(57) ABSTRACT

A performance indicator monitoring system (PIMS) receives a plurality of operational measurements (OMs) for each performance indicator (PI), which may be stored on a first storage. A rate of access by a monitoring system is determined for the PI. The rate may be determined, for example, related to a counter of the PI. An enriched dataset related to a subset of the plurality of OMs is generated, upon determination that the selected PI rate of use is higher than a primary threshold value. The generated enriched dataset may be stored in a second storage. In some embodiments, a component of the PIMS, such as a processing unit, is determined. A usage level of the component is then determined, and the enriched dataset is generated if the usage level of the component is below a secondary threshold.

29 Claims, 3 Drawing Sheets

SYSTEM, METHOD, AND COMPUTER PROGRAM PRODUCT FOR EFFICIENT PERFORMANCE INDICATOR MEASUREMENT VALUE GENERATION

CROSS REFERENCE TO RELATED APPLICATIONS

The present disclosure is a U.S. NonProvisional Patent Application, which claims the benefit under 35 U.S.C. Section 119(e) of U.S. Provisional Patent Application No. 62/358,574, Conf. No. 7791, filed Jul. 6, 2016, entitled, "A System and Method for Efficient Performance Indicator Measurement Value Generation," the contents of which is incorporated herein by reference in its entirety.

BACKGROUND

Technical Field of the Disclosure

The disclosure generally relates to generating enriched datasets in telecommunication networks and particularly to selecting performance indicators for generating enriched datasets in relation thereof.

Related Art

Telecommunication networks typically involve a large number of components, such as logical and physical network elements, and element managers. These components may be monitored by monitoring systems, which receive a plurality of measurements respective of, i.e., related to, or corresponding to, a plurality of performance indicators. Values have to be generated from these measurements to provide meaningful results, which can be interpreted by administrators of the network.

Generating enriched datasets is typically computer resource-intensive, i.e., computer processing power and computer storage are both required. Typically, a set of performance indicators is selected from a plurality of performance indicators, for which enriched datasets are generated frequently. However, the importance of certain performance indicators may change over time, resulting in the monitoring system generating enriched datasets for performance indicators which are not currently needed by the administrators of the network. This leads to a waste in system resources.

SUMMARY

An example embodiment of the claimed invention sets forth a system, method, and/or computer program product for generating an enriched dataset of performance indicators.

According to one example embodiment, a computer implemented method for generating an enriched dataset respective of, or related to, performance indicators (PIs), the method can include: receiving, by at least one computer processor, of a PI monitoring system (PIMS) a plurality of operational measurements (OMs); storing, by the at least one computer processor, the plurality of OMs on a first storage device communicatively connected coupled to the PIMS; selecting, by the at least one computer processor, a PI from a plurality of PIs, each PI generated from at least a portion of the plurality of OMs; determining, by the at least one computer processor, a rate of use of the selected PI by the PIMS; and generating, by the at least one computer processor, at a predetermined time, an enriched dataset respective of, or related to, the at least a portion of the plurality of OMs, upon determination that the rate of use of the selected PI exceeds a primary threshold value.

According to one example embodiment, the computerized method can further include, storing, by the at least one computer processor, the enriched dataset on a second storage device.

According to one example embodiment, the computerized method can include, where the second storage device includes at least a performance characteristic higher than the first storage device.

According to one example embodiment, the computerized method can include where the performance characteristic can include any of, or at least one of: access time, update latency, cost per bit, and/or endurance.

According to one example embodiment, the computerized method can include where the second storage device can include a distributed storage.

According to one example embodiment, the computerized method can further include, cancelling, by the at least one computer processor, the instruction to generate the enriched dataset, upon determination that the rate of use of the selected PI is lower than the primary threshold value.

According to one example embodiment, the computerized method can further include, storing, by the at least one computer processor, the enriched dataset in any at least one of: a database structure, and/or a distributed file system.

According to one example embodiment, the computerized method can include where at least a portion of the plurality of OMs are received from any at least one of: a network element, and/or a service.

According to one example embodiment, the computerized method can include where the selected PI can include at least one of: a key performance indicator (KPI), and or a key quality indicator (KQI).

According to one example embodiment, the computerized method can further include, determining, by the at least one computer processor, at least a component of the PIMS; and determining, by the at least one computer processor, a usage level of the at least a component of the PIMS for generating the enriched dataset.

According to one example embodiment, the computerized method can include where the at least a component is any can include at least one of: a processing unit (PU), a storage device, and/or a memory.

According to one example embodiment, the computerized method can include where generating, by the at least one computer processor, an enriched dataset is performed upon determination that the usage level of the at least a component of the PIMS for generating the enriched dataset is below a secondary threshold.

According to one example embodiment, the computerized method can include where the usage level of the at least a component of the PIMS for generating the enriched dataset is above a secondary threshold, further including: sending, by the at least one computer processor, an alert to a user of the PIMS.

According to one example embodiment, the computerized method can further include, sending, by the at least one computer processor, an alert to the user of the PIMS, upon determination that the selected PI rate of use is below the primary threshold value.

According to one example embodiment, the computerized method can include where the plurality of OMs are received as unparsed data sets.

According to yet another example embodiment, a performance indicator monitoring system (PIMS) for generating an enriched dataset respective of, or relating to performance indicators (PIs), the PIMS including: a computer processing unit; a computer memory containing instructions that, when executed by the computer processing unit, configure the system to: receive a plurality of operational measurements (OMs); store the plurality of OMs on a first storage device communicatively connected coupled to the PIMS; select a PI from a plurality of PIs, each PI generated from at least a portion of the plurality of OMs; determine a rate of use of the selected PI by the PIMS; and generate, at a predetermined time, an enriched dataset respective of, or related to the at least a portion of the plurality of OMs, upon determination that the rate of use of the selected PI exceeds a primary threshold value.

According to one example embodiment, the PIMS can include where the computer memory contains instructions that when executed by the computer processing unit further configure the PIMS to: store the enriched dataset on a second storage device.

According to one example embodiment, the PIMS can include, where the second storage device has at least a performance characteristic higher than any of the plurality of OMs stored on the first storage device.

According to one example embodiment, the PIMS can include, where the performance characteristic is can include at least one of, or any of: access time, update latency, cost per bit, and/or endurance.

According to one example embodiment, the PIMS can include, where the second storage device is can include a distributed storage.

According to one example embodiment, the PIMS can include, where the computer memory contains instructions that when executed by the computer processing unit further configure the PIMS to: cancel the instruction to generate the enriched dataset, upon determination that the rate of use of the selected PI is lower than the primary threshold value.

According to one example embodiment, the PIMS can include, where the computer memory contains instructions that when executed by the computer processing unit further configure the PIMS to: store the enriched dataset in any at least one of: a database structure, and/or a distributed file system.

According to one example embodiment, the PIMS can include, where at least a portion of the plurality of OMs are received from any at least one of: network element, and/or a service.

According to one example embodiment, the PIMS can include, where the selected PI can include at least one of, or any of: a key performance indicator (KPI), and/or a key quality indicator (KQI).

According to one example embodiment, the PIMS can include, where the computer memory contains instructions that when executed by the computer processing unit further configure the PIMS to: determine at least a component of the PIMS; and determine a usage level of the at least a component of the PIMS to generate the enriched dataset.

According to one example embodiment, the PIMS can include, where the at least a component can include any of, or at least one of: a computer processing unit (PU), a storage device, and/or a computer memory.

According to one example embodiment, the PIMS can include, where the to generate an enriched dataset is performed upon determination that the usage level of the at least a component of the PIMS for to generating generate the enriched dataset is below a secondary threshold.

According to one example embodiment, the PIMS can include, where the usage level of the at least a component of the PIMS to generate the enriched dataset is above a secondary threshold, and wherein the computer memory contains instructions that when executed by the processing unit further configure the PIMS to: send an alert to a user of the PIMS.

According to one example embodiment, the PIMS can include, where the computer memory contains instructions that when executed by the computer processing unit further configure the PIMS to: send an alert to the user of the PIMS, upon determination that the selected PI rate of use is below the primary threshold value.

According to one example embodiment, the computerized method can include, where the plurality of OMs are received as unparsed data sets.

According to one example embodiment, a non-transitory computer readable medium having stored thereon instructions for causing one or more processing units to execute the method.

BRIEF DESCRIPTION OF THE DRAWINGS

The foregoing and other features and advantages will become apparent and more readily appreciated from the following detailed description taken in conjunction with the accompanying drawings, in which.

DETAILED DESCRIPTION OF VARIOUS EXEMPLARY EMBODIMENTS

Figure 1:
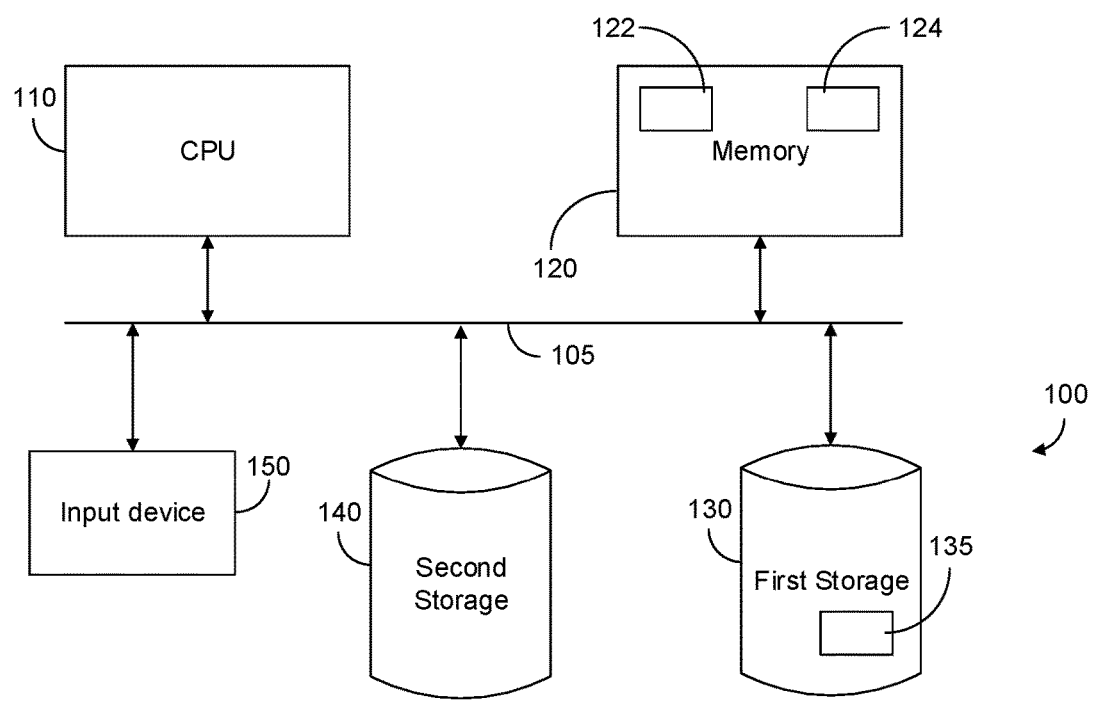
FIG. 1—is a schematic illustration of a performance indicator monitoring system (PIMS) for generating an enriched dataset respective of, i.e., related to, or corresponding to, performance indicators (PIs) implemented according to an embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout, as well as the first digit of a reference number shall generally indicate a first drawing figure in which the labeled component appears.

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality.

A performance indicator monitoring system (PIMS) receives a plurality of operational measurements (OMs) for each performance indicator (PI), which may be stored on a first computer storage device. A rate of access by a monitoring system is determined for the PI. The rate may be determined, for example, respective of, i.e., related to, or corresponding to, a counter of the PI. An enriched dataset respective of, i.e., related to, or corresponding to, a subset of the plurality of OMs is generated, upon determination that the selected PI rate of use is higher than a primary threshold value. The generated enriched dataset may be stored in a second storage. In some embodiments, a component of the PIMS, such as, e.g., but not limited to, a computer processing unit, a central processing unit, or other processing unit, is determined. A usage level of the component is then determined, and the enriched dataset is generated if the usage level of the component is below a secondary threshold.

FIG. 1 is an exemplary and non-limiting schematic illustration of a performance indicator monitoring system (PIMS) 100 for selecting a performance indicator (PI) from a plurality of PIs for generation of an enriched dataset by the PIMS, implemented according to an embodiment. The PIMS 100 includes at least one computer processing element 110, such as, for example, but not limited to, a central processing unit (CPU). In an embodiment, the computer processing element 110 includes, or is a component of, a larger processing unit implemented with one or more computer processors. The one or more computer processors may be implemented with any combination of general-purpose microprocessors, microcontrollers, digital signal processors (DSPs), field programmable gate array (FPGAs), programmable logic devices (PLDs), application specific integrated circuits (ASICs), controllers, state machines, gated logic, discrete hardware components, dedicated hardware finite state machines, general purpose graphic processing unit (GPGPU), or any other suitable entities that can perform calculations or other manipulations of information. The CPU 110 is coupled via a bus 105 to a memory 120. The computer processing unit 110 and/or the computer memory 120 may also include machine-readable storage media for storing software, stored for example in memory portion 122. Software shall be construed broadly to mean any type of instructions, whether referred to as software, firmware, middleware, microcode, hardware description language, or otherwise. Instructions may include code (e.g., but not limited to, in source code format, binary code format, executable code format, or any other suitable format of code). The instructions, when executed by the one or more computer processors, cause the PIMS to perform the various functions described in further detail herein. The memory 120 may be further used as a working scratch pad for the computer processing element 110, a temporary storage, and others, as the case may be. The computer memory 120 may be a volatile memory such as, e.g., but not limited to random access memory (RAM), or non-volatile memory (NVM), such as, e.g., but not limited to, Flash memory. Memory 120 may further include memory portion 124 containing a selected performance indicator. The computer processing element 110 may be coupled to an input device 150. The input device 150 is configured to allow the PIMS 100 access to a plurality of operational measurements (OMs). The computer processing element 110 may be further coupled with a first storage 130. First storage 130 may be used for the purpose of holding a copy of the method executed in accordance with the disclosed technique. First storage 130 may further include a storage portion 135 containing therein a list of performance indicators, for each of which the PIMS 100 can generate an enriched dataset. In an embodiment, the PIMS 100 can further include a second storage 140. The second storage may be used to store an enriched dataset, as detailed below. In some embodiments, the second storage is communicatively connected or coupled to the PIMS 100, for example as a distributed storage. The distributed storage may be network accessible, for example, using a network interface controller (NIC, not shown) coupled to the bus 105. In some embodiments, some technical aspects of the second storage 140 may be more advantageous over similar technical aspects of the first storage 130. For example, the second storage 140 may have faster access speeds than the first storage 130.

Figure 2:
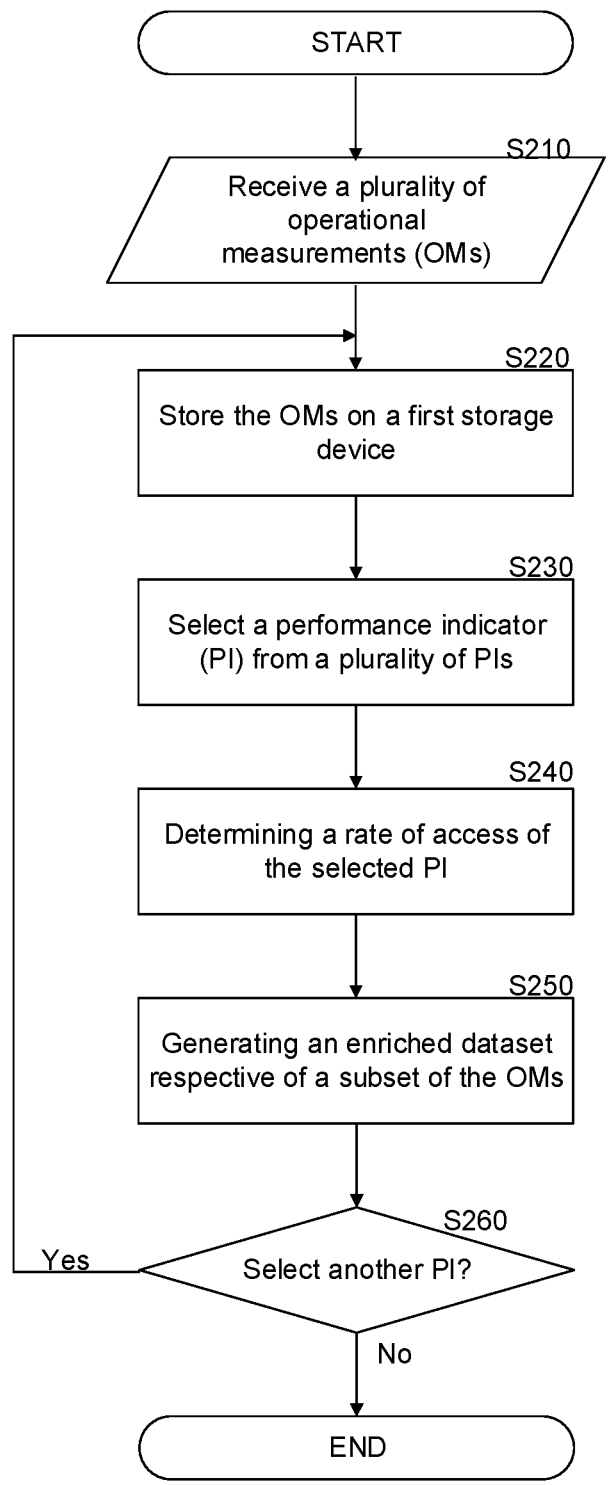
FIG. 2—is a flowchart of a computerized method for selecting a PI from a plurality of PIs for generation of an enriched dataset by a monitoring system of a telecommunication network in accordance with an embodiment.

FIG. 2 is an exemplary and non-limiting flowchart of a computerized method for generating an enriched dataset respective of, i.e., related to, or corresponding to, performance indicators (PIs) in accordance with an embodiment.

In S210 a performance indicator management system, in an example embodiment, such as PIMS 100 of FIG. 1, can receive a plurality of operational measurements (OMs). The plurality of OMs may be received, for example, as an unparsed data set. Parsing the data sets is performed, and the parsed data for each PI may be stored on a storage device, such as storage portion 135 of the first storage device 130. The plurality of OMs may be received from a network element of a telecommunication network.

In S220 the plurality of OMs are stored on a first storage device communicatively connected or coupled to the PIMS.

In S230 a PI is selected from a plurality of PIs, i.e., a selection may be received. The selected PI may be, for example, a key performance indicator (KPI) or a key quality indicator (KQI). Each PI is generated respective of, i.e., related to, or corresponding to, a subset of OMs of the plurality of OMs. In an exemplary embodiment, a KPI may be call set-up success rate (CSSR), call drop rate (CDR), and the like.

In S240 a rate of access of the selected PI by the PIMS is determined. Determining a rate of access of the selected PI may be performed by using a counter to count the number of times a selected PI is accessed by the PIMS. The rate may be further determined respective of, i.e., related to, or corresponding to, a time frame; for example, a PI is accessed seven (7) times within a period of twenty-four (24) hours. In this example, the PIMS may generate the PI each time, or in another example, may generate the PI once and provide access to the generated PI seven times. In an embodiment, a PIMS is considered to have accessed a PI if an enriched dataset respective of, i.e., related to, or corresponding to, at least a subset of the OMs of the plurality of OMs is generated. In other embodiments, a PIMS is considered to have accessed the PI if an enriched dataset respective of, i.e., related to, or corresponding to, at least a subset of the OMs of the plurality of OMs is generated once, and accessed: by the PIMS, a user of the PIMS, or a user device communicatively connected or coupled to the PIMS. A user device may be a mobile device, smartphone, tablet, computer, and the like.

In S250 an enriched dataset respective of, i.e., related to, or corresponding to, the subset of the plurality of OMs is generated, upon determination that the rate of use of the selected PI is higher than a primary threshold value. Data enrichment may include processing the subset of OMs, for example by parsing values, truncating numeric decimal values, generating a PI and the like. The threshold may be static, dynamic or adaptive. Static thresholds are predetermined thresholds that remain constant. Dynamic thresholds are forcefully changed, for example, at a certain time of day, or a certain day of the year. Adaptive thresholds are changed in response to changes in characteristics of the network and may vary depending on a variety of parameters. The generated enriched data set may be stored in a second storage. In some embodiments, the second storage device has at least a performance characteristic higher than the first storage device. In an embodiment, a performance characteristic may be access time of the second storage device, update latency, or endurance. In some embodiments, the first storage and the second storage are implemented on the same physical or logical storage device. In certain embodiments, the enriched dataset is stored on a second storage, for example, second storage 140 of PIMS 100.

In S260 a check is performed to determine if additional PIs are selected. If so, execution can continue at S210; otherwise execution can terminate.

Figure 3:
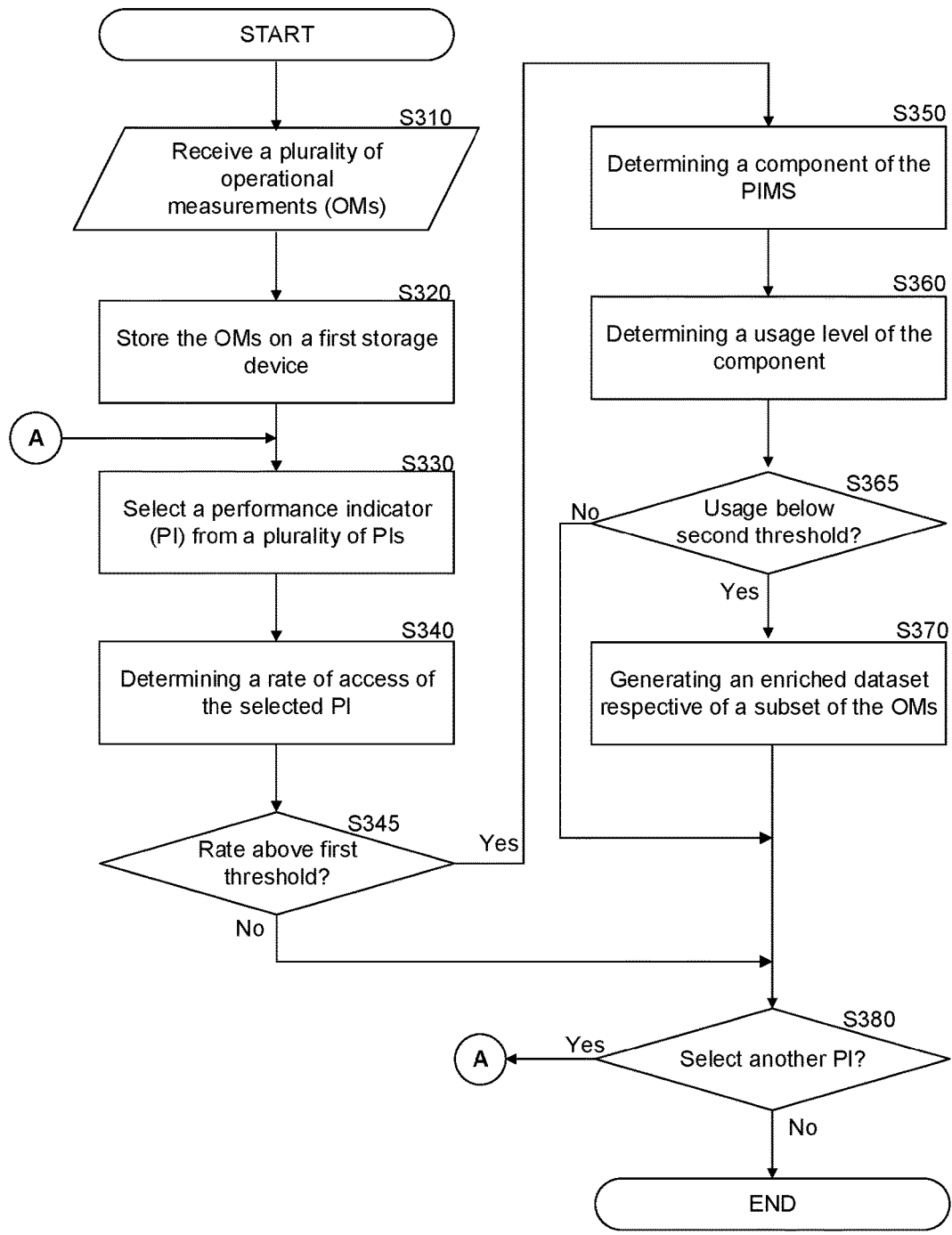
FIG. 3—is a flowchart of a computerized method for generating an enriched dataset respective of, i.e., related to, or corresponding to, performance indicators (PIs) and a system component, in accordance with an embodiment.

FIG. 3 is a non-limiting and exemplary flowchart of a computerized method for generating an enriched dataset respective of, i.e., related to, or corresponding to, performance indicators (PIs) and a system component, in accordance with an embodiment.

In S310 a performance indicator management system, such as PIMS 100 of FIG. 1, can receive a plurality of operational measurements (OMs). The plurality of OMs may be received, for example, as an unparsed data set. Parsing the data sets can be performed, and the parsed data for each PI may be stored on a storage device, such as, e.g., but not limited to, storage portion 135 of first storage device 130. The plurality of OMs may be received from a network element of a telecommunication network.

In S320 the plurality of Oms are stored on a first storage device communicatively connected or coupled to the PIMS.

In S330 a PI is selected from a plurality of PIs, i.e., a selection can be received. The selected PI may be, for example, a key performance indicator (KPI) or a key quality indicator (KQI). Each PI is generated respective of, i.e., related to, or corresponding to, a subset of OMs of the plurality of OMs. In an exemplary embodiment, a KPI may be call set-up success rate (CSSR), call drop rate (CDR), and the like.

In S340 a rate of access of the selected PI by the PIMS is determined. Determining a rate of access of the selected PI may be performed by using a counter to count the number of times a selected PI is accessed by the PIMS. The rate may be further determined respective of, i.e., related to, or corresponding to, a time frame; for example, a PI is accessed seven (7) times within a period of twenty-four (24) hours. In this example, the PIMS may generate the PI each time, or in another example generate the PI once and provide access to the generated PI seven times. In an embodiment, a PIMS is considered to have accessed a PI if an enriched dataset respective of, i.e., related to, or corresponding to, at least a subset of the OMs of the plurality of OMs is generated. In other embodiments, a PIMS is considered to have accessed the PI if an enriched dataset respective of, i.e., related to, or corresponding to, at least a subset of the OMs of the plurality of OMs is generated once, and accessed: by the PIMS, a user of the PIMS, or a user device communicatively connected or coupled to the PIMS. A user device may be a mobile device, smartphone, tablet, computer, and the like.

In S345 a check is performed to determine if the rate of access is above a first threshold. The threshold may be, e.g., but not limited to, static, dynamic or adaptive. Static thresholds are predetermined thresholds that remain constant. Dynamic thresholds are forcefully changed, for example, at a certain time of day, or a certain day of the year. Adaptive thresholds are changed in response to changes in characteristics of the network and may vary depending on a variety of parameters. If the rate of access is above the first threshold, execution can continue at S350, otherwise execution can continue at S380. In certain embodiments, parsed data sets may be stored in a storage device, upon determination that the selected PI rate of access is below the first threshold value.

In S350 a component of the PIMS can be determined. Generation of enriched datasets may be resource intensive for different performance indicators. The component may be, for example, a processing unit such as a central processing unit (CPU) or a general purpose graphic processing unit (GPGPU), a storage, or a memory. It is understood that in certain embodiments, a plurality of components may be determined, and the disclosure is not restricted to selecting a single component of the system.

In S360 a usage level of the component of the PIMS is determined. The usage level may be further determined respective of, i.e., related to, or corresponding to, a time frame. For example, at least 28% (twenty eight percent) of a CPU's calculations in a given cycle are devoted to generating the enriched dataset. In another example, 47% (forty seven percent) of the PIMS's memory is devoted to generating the enriched dataset.

In S365 a check can be performed to determine if the usage level of the component is below a secondary threshold. The threshold may be, e.g., but not limited to, static, dynamic or adaptive. Static thresholds are predetermined thresholds that remain constant. Dynamic thresholds are forcefully changed, for example, at a certain time of day, or a certain day of the year. Adaptive thresholds are changed in response to changes in characteristics of the network and may vary depending on a variety of parameters. This may be used, for example to indicate the intensity of use of system resources. For example, generation of an enriched dataset for a first PI may use a relatively large portion of a CPU's processing power. If the generated enriched dataset of the first PI is then either not frequently used, or not used at all by the monitoring system, then the resource has been wasted. If the usage level of the component is below the secondary threshold, execution can continue at S370, otherwise execution can continue at S380.

In S370 an enriched dataset respective of, i.e., related to, or corresponding to, the subset of the plurality of OMs is generated. Data enrichment may include processing the subset of OMs, for example by parsing values, truncating numeric decimal values, generating a PI and the like. The generated enriched data set may be stored in a second storage, for example second storage 140 of PIMS 100. In some embodiments, the second storage device has at least a performance characteristic higher than the first storage device. In an embodiment, a performance characteristic may be access time of the second storage device, update latency, cost per bit, and/or endurance. In some embodiments, the first storage and the second storage are implemented on the same physical or logical storage device.

In S380 a check can be performed to determine if additional PIs are selected. If so, execution continues at S330; otherwise execution can terminate.

In some embodiments, if the usage level of the component is above the secondary threshold, an alert may be sent to a user of the PIMS. In some embodiments, an alert is sent to a user of the PIMS, upon determination that the selected PI rate of access is below the primary threshold value.

The principles of the disclosure are implemented as hardware, firmware, software or any combination thereof. Moreover, the software is preferably implemented as an application program tangibly embodied on a computer program storage unit or computer readable storage medium. The application program may be uploaded to, and executed by, a machine comprising any suitable architecture. Preferably, the machine is implemented on a computer platform having hardware such as, e.g., but not limited to, a central or other processing unit ("CPU"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected or coupled to the computer platform such as an additional data storage unit and a printing unit and/or display unit.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computer implemented method for generating an enriched dataset related to performance indicators (PIs), the method comprising:
   receiving, by at least one computer processor, of a PI monitoring system (PIMS) a plurality of operational measurements (OMs);
   storing, by the at least one computer processor, the plurality of OMs on a first storage device communicatively coupled to the PIMS;
   selecting, by the at least one computer processor, a PI from a plurality of PIs, each PI generated from at least a portion of the plurality of OMs;
   determining, by the at least one computer processor, a rate of use of the selected PI by the PIMS;
   generating, by the at least one computer processor, at a predetermined time, an enriched dataset related to the at least a portion of the plurality of OMs, upon determination that the rate of use of the selected PI exceeds a primary threshold value, the enriched dataset comprising at least a result of processing one or more OMs;
   determining, by the at least one computer processor, at least a component of the PIMS; and
   determining, by the at least one computer processor, a usage level of the at least a component of the PIMS for generating the enriched dataset.

2. The computerized method of claim 1, further comprising:
   storing, by the at least one computer processor, the enriched dataset on a second storage device.

3. The computerized method of claim 2, wherein the second storage device comprises at least a performance characteristic higher than the first storage device.

4. The computerized method of claim 3, wherein the performance characteristic comprises at least one, or more of:
   access time,
   update latency,
   cost per bit, or
   endurance.

5. The computerized method of claim 2, wherein the second storage device comprises a distributed storage.

6. The computerized method of claim 1, further comprising:
   cancelling, by the at least one computer processor, an instruction to generate the enriched dataset, upon determination that the rate of use of the selected PI is lower than the primary threshold value.

7. The computerized method of claim 1, further comprising:
   storing, by the at least one computer processor, the enriched dataset in at least one, or more of:
   a database structure, or
   a distributed file system.

8. The computerized method of claim 1, wherein at least a portion of the plurality of OMs are received from at least one, or more of:
   a network element, or
   a service.

9. The computerized method of claim 1, wherein the selected PI comprises at least one, or more of:
   a key performance indicator (KPI), or
   a key quality indicator (KQI).

10. The computerized method of claim 1, wherein the at least a component comprises at least one, or more of:
    a processing unit (PU),
    a storage device, or
    a memory.

11. The computerized method of claim 1, wherein generating, by the at least one computer processor, an enriched dataset is performed upon determination that the usage level of the at least a component of the PIMS for generating the enriched dataset is below a secondary threshold.

12. The computerized method of claim 1, wherein the usage level of the at least a component of the PIMS for generating the enriched dataset is above a secondary threshold, further comprising:
    sending, by the at least one computer processor, an alert to a user of the PIMS.

13. The computerized method of claim 1, further comprising:
    sending, by the at least one computer processor, an alert to a device of a user of the PIMS, upon determination that the selected PI rate of use is below the primary threshold value.

14. The computerized method of claim 1, wherein the plurality of OMs are received as unparsed data sets.

15. A performance indicator monitoring system (PIMS) for generating an enriched dataset relating to performance indicators (PIs), the PIMS comprising:
    at least one computer processing device unit;
    a computer memory containing instructions that, when executed by the at least one computer processing device unit, configure the system to:
    receive a plurality of operational measurements (OMs);
    store the plurality of OMs on a first storage device communicatively coupled to the PIMS;
    select a PI from a plurality of PIs, each PI generated from at least a portion of the plurality of OMs;
    determine a rate of use of the selected PI by the PIMS;
    generate, at a predetermined time, an enriched dataset related to the at least a portion of the plurality of OMs, upon determination that the rate of use of the selected PI exceeds a primary threshold value, the enriched dataset comprising at least a result of processing one or more OMs;
    determine at least a component of the PIMS; and determine a usage level of the at least a component of the PIMS to generate the enriched dataset.

16. The PIMS of claim 15, wherein the computer memory contains instructions that when executed by the at least one computer processing device unit further configure the PIMS to:
store the enriched dataset on a second storage device.

17. The PIMS of claim 16, wherein the second storage device has at least a performance characteristic higher than any of the plurality of OMs stored on the first storage device.

18. The PIMS of claim 17, wherein the performance characteristic comprises at least one, or more of:
access time,
update latency,
cost per bit, or
endurance.

19. The PIMS of claim 16, wherein the second storage device comprises a distributed storage.

20. The PIMS of claim 15, wherein the computer memory contains instructions that when executed by the at least one computer processing device unit further configure the PIMS to:
cancel the instruction to generate the enriched dataset, upon determination that the rate of use of the selected PI is lower than the primary threshold value.

21. The PIMS of claim 15, wherein the computer memory contains instructions that when executed by the at least one computer processing device unit further configure the PIMS to:
store the enriched dataset in at least one, or more of:
a database structure, or
a distributed file system.

22. The PIMS of claim 15, wherein at least a portion of the plurality of OMs are received from at least one, or more of:
a network element, or
a service.

23. The PIMS of claim 15, wherein the selected PI comprises at least one, or more of:
a key performance indicator (KPI), or
a key quality indicator (KQI).

24. The PIMS of claim 15, wherein the at least a component comprises at least one, or more of:
at least one computer processing device unit (PU),
a storage device, or
a computer memory.

25. The PIMS of claim 15, wherein said to generate an enriched dataset is performed upon determination that the usage level of the at least a component of the PIMS to generate the enriched dataset is below a secondary threshold.

26. The PIMS of claim 15, wherein the usage level of the at least a component of the PIMS to generate the enriched dataset is above a secondary threshold, and wherein the computer memory contains instructions that when executed by the at least one processing device unit further configure the PIMS to:
send an alert to a user of the PIMS.

27. The PIMS of claim 15, wherein the computer memory contains instructions that when executed by the at least one computer processing device unit further configure the PIMS to:
send an alert to a device of a user of the PIMS, upon determination that the selected PI rate of use is below the primary threshold value.

28. The PIMS of claim 15, wherein the plurality of OMs are received as unparsed data sets.

29. A non-transitory computer readable medium having stored thereon instructions for causing one or more processing units to execute the method according to claim 1.

* * * * *